UNITED STATES PATENT OFFICE.

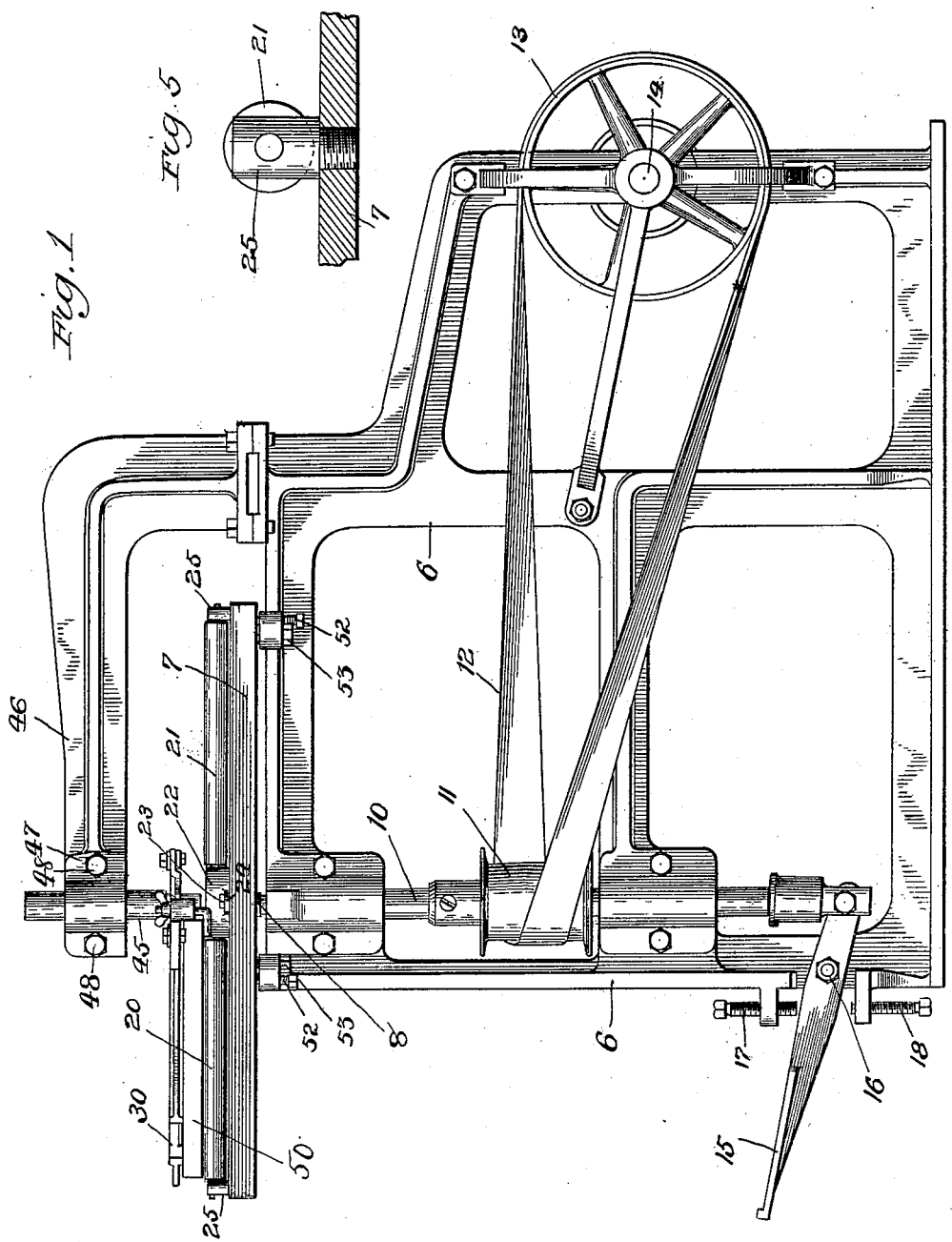

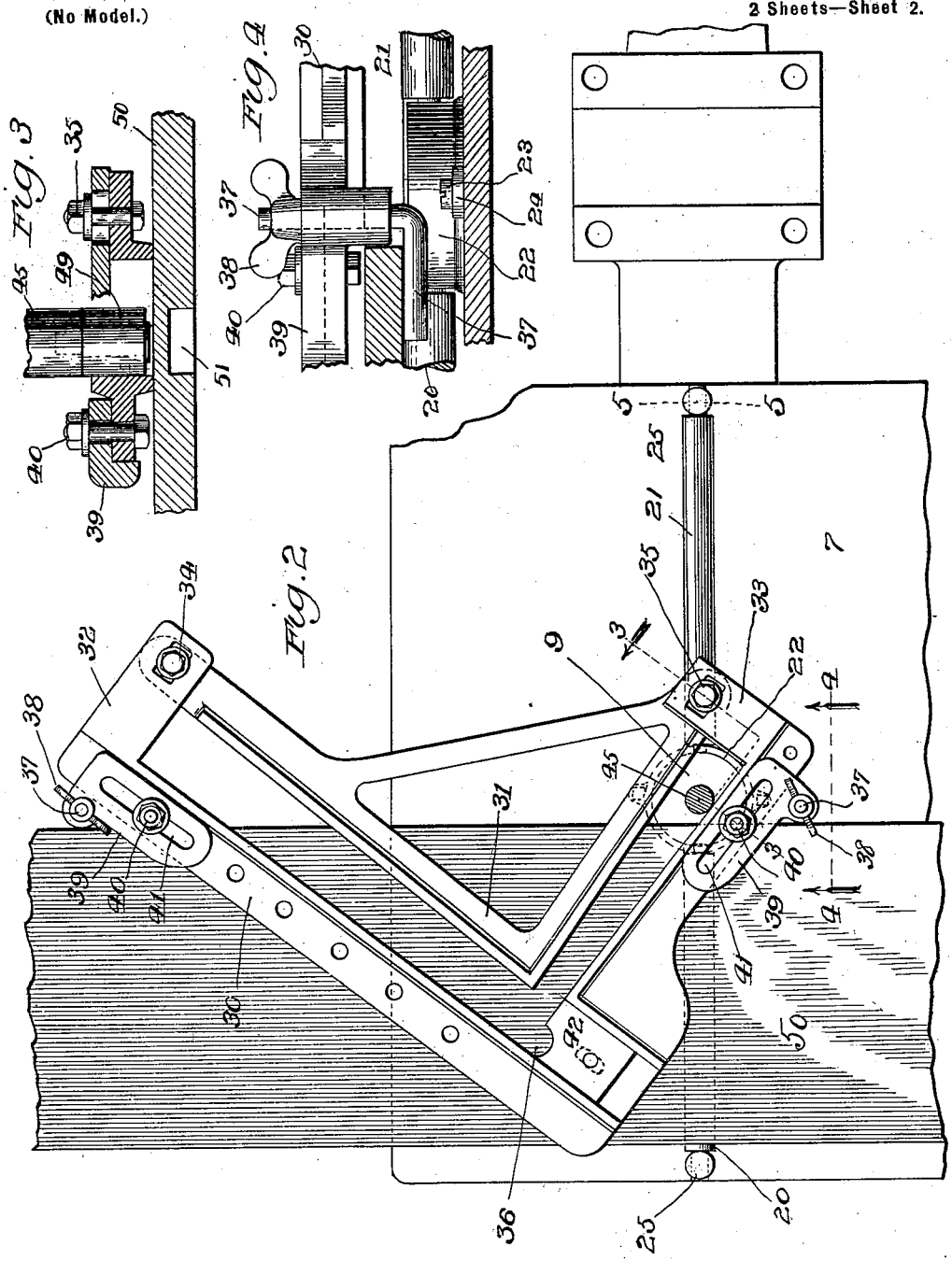

FRANCIS V. PHILLIPS, OF WINTERPARK, FLORIDA, ASSIGNOR TO THE SMITH AND PHILLIPS MANUFACTURING COMPANY, OF CHICAGO, ILLINOIS, A CORPORATION OF ILLINOIS.

STAIR-ROUTING MACHINE.

SPECIFICATION forming part of Letters Patent No. 700,813, dated May 27, 1902.

Application filed November 7, 1900. Serial No. 35,708. (No model.)

*To all whom it may concern:*

Be it known that I, FRANCIS VORBURGH PHILLIPS, a citizen of the United States, residing in Winterpark, in the county of Orange and State of Florida, have invented a new and useful Improvement in Stair-Routing Machines, of which the following is a specification.

This invention relates to an improved machine for routing the stringers or side pieces of stairs; and its object is to provide a simple, compact, efficient, and economical machine for the purpose.

The nature of the invention will be fully understood from the description given below and from the accompanying drawings, in which—

Figure 1 is a side elevation of the machine. Fig. 2 is a plan view of the table with a stringer in place thereon. Figs. 3, 4, and 5 are sections on the lines 3 3, 4 4, and 5 5 of Fig. 2.

In said drawings, 6 represents a supporting-frame, and 7 is a table mounted thereon. The cutting-tool 8 is movable up to the work through an opening 9 in the table and is carried in the upper end of a spindle 10, operated by the pulley 11, receiving power through the medium of belt 12, pulley 13, and drive-shaft 14. A foot-lever 15, pivoted at 16, is employed to raise the spindle, and thus bring the cutter to the operating-level, and stop-screws 17 and 18 are employed to regulate the movements of the lever.

The work is supported on the table by means of two long rollers 20 and 21, placed in line with each other and upon opposite sides of the cutter. Both of these rollers are journaled at one end in a ring 22, which is placed on the table and around the cutter-opening and secured in place by a screw 23 passing through a horizontal projection 24, formed on the ring. The journals at the other ends of the rollers are inserted in openings in posts 25, inserted in the table near its edges and having a threaded engagement therewith. The ring 22 serves to catch the shavings and chips and to conduct them away from the work. In positioning the rollers the posts are first inserted in the table, and the journals of the rollers are then inserted therein and also in the openings prepared for them in the ring, while the ring is positioned at equal distances from the two posts, but out of line therewith. There will then be no difficulty in moving the ring into line and securing it by the screw 23.

For guiding the movements of the stringer over the cutter I employ a former or pattern-frame having an L-shaped opening corresponding in shape and dimension to the cut to be made in the stringer and which is attached to the upper side of the board with the L-opening exactly opposite the point at which the under surface of the board is to be routed, and in conjunction with such pattern-frame a vertical guide-pin is located directly above the board and where it may enter the L-opening in the pattern-frame and serve as a means of regulating the movements of the board. The frame referred to consists of two L-shaped castings 30 and 31. The larger of these is provided at the end of each limb with right-angle projections 32 and 33, to which the smaller casting is bolted by bolts 34 and 35. The bolt-holes in the projections 32 and 33 are both elongated, as shown, so as to permit adjustments of the inner casting to vary the cut to suit the thickness of the stair-tread and also to vary the taper widthwise of either or both branches of the cut. The notch shown at 36 is intended to conform to the rounded front edge of stair-treads. The frame is secured to the top of the stringer by right-angle clamps 37, adapted to set under the board and to be tightened upon it by thumb-nuts 38, the clamps being supported in adjustable slotted keepers 39, held to the larger casting 30 by bolts 40. Openings through the flanges of the casting 30 are provided, as at 41, to permit a wide range of adjustment to the keepers 39. At the corner of the cut a changeable or adjustable piece 42, containing the notch 36, may be employed, if desired, so as to permit variations in the cut at that point, and such piece may be frictionally or otherwise suitably secured.

The guide-pin, which enters the pattern-slot opening in the guide-frame, is shown at 45. It is stationarily supported directly over and in line with the cutter by an overhanging arm 46, to which it is clamped by the plate 47 and screws 48. It is preferably positioned so it will prevent any upward jumping by the stock, and while cutting the operator keeps the wall of the pattern-opening close up against it, moving the stock first with the wall on one side of the opening against the pin and then reversing with the wall on the other side against it, thus causing the routing of so much of the under surface of the board as lies directly below the pattern-opening. The bottom 49 of the pin is preferably made separate from the upper part thereof and pivoted thereto on a vertical pivot, so such part 49 may serve as an antifriction-roller adapted to bear against the walls of the pattern and ease the movements of the stringer.

The stringer rests upon the rollers 20 and 21 during the operation, and consequently is easily manipulated and is unaffected by escaping chips and shavings lodging on the table. The ring will catch the majority of the shavings, however, and prevent their lodging on the table. I prefer to make the ring, the rollers 20 and 21, posts 25, and pin 45 all removable, as the machine can then be used for other work than routing stair-stringers.

A stringer is shown in the machine at 50 in Figs. 1, 2, and 3, and in the latter figure the routing appears at 51. The table 7 is vertically adjustable by means of the set-screw 52 and locking-bolt 53.

I claim—

1. The combination with a stationary table, the work-supporting rollers 20 and 21, and a cutter movable vertically upward through the table, the rollers being arranged in alinement with the cutter and with each other, of the pattern-frame adapted to be secured to the upper surface of the stringer and means for guiding the movements of the stringer in accordance with the pattern, substantially as specified.

2. The combination with the table of a stair-routing machine of rollers 20 and 21, the ring 22, and posts 25, substantially as specified.

3. The combination with the table and cutter of a stair-routing machine of rollers 20 and 21 at opposite sides of the cutter, a ring 22 surrounding the cutter, and posts 25, the rollers being journaled in the ring and posts, substantially as specified.

4. The combination with the table and cutter of the stair-routing machine, of rollers 20 and 21 journaled in removable supports and supporting the stringers, the rollers being independent of each other and located in alinement with the cutter and with each other and at opposite sides of the cutter, substantially as specified.

5. The combination with the table and cutter of a stair-routing machine of the work-supporting rollers 20 and 21, and the ring 22 secured to the table around the cutter opening and serving both to intercept the shavings and as a support to said rollers, substantially as specified.

6. The pattern-frame for stair-routing consisting of two L-shaped pieces, one of which is provided with right-angled projections at its extremities to which the other piece is joined by bolts passing through elongated slots and by which means the pieces are rigidly held in their relative positions, substantially as specified.

7. The combination with the table and cutter, of removable rollers for supporting the stock, a removable ring encircling the cutter and supporting the rollers at their inner ends, and removable posts supporting the outer ends of the rollers, substantially as specified.

FRANCIS V. PHILLIPS.

Witnesses:
E. L. MAXSON,
DE BATCHELOR.